Nov. 26, 1963 R. G. HUMMER 3,112,121
NESTING SHOPPING CART HAVING USER CONTROLLED BRAKE MEANS
RELEASED BY NESTING ACTION OF ANOTHER LIKE CART
Filed Dec. 28, 1961 3 Sheets-Sheet 1

INVENTOR
RALPH G. HUMMER
BY *Herman Seid*
*Robert W. Sadler*
ATTORNEYS.

INVENTOR
RALPH G. HUMMER
ATTORNEYS.

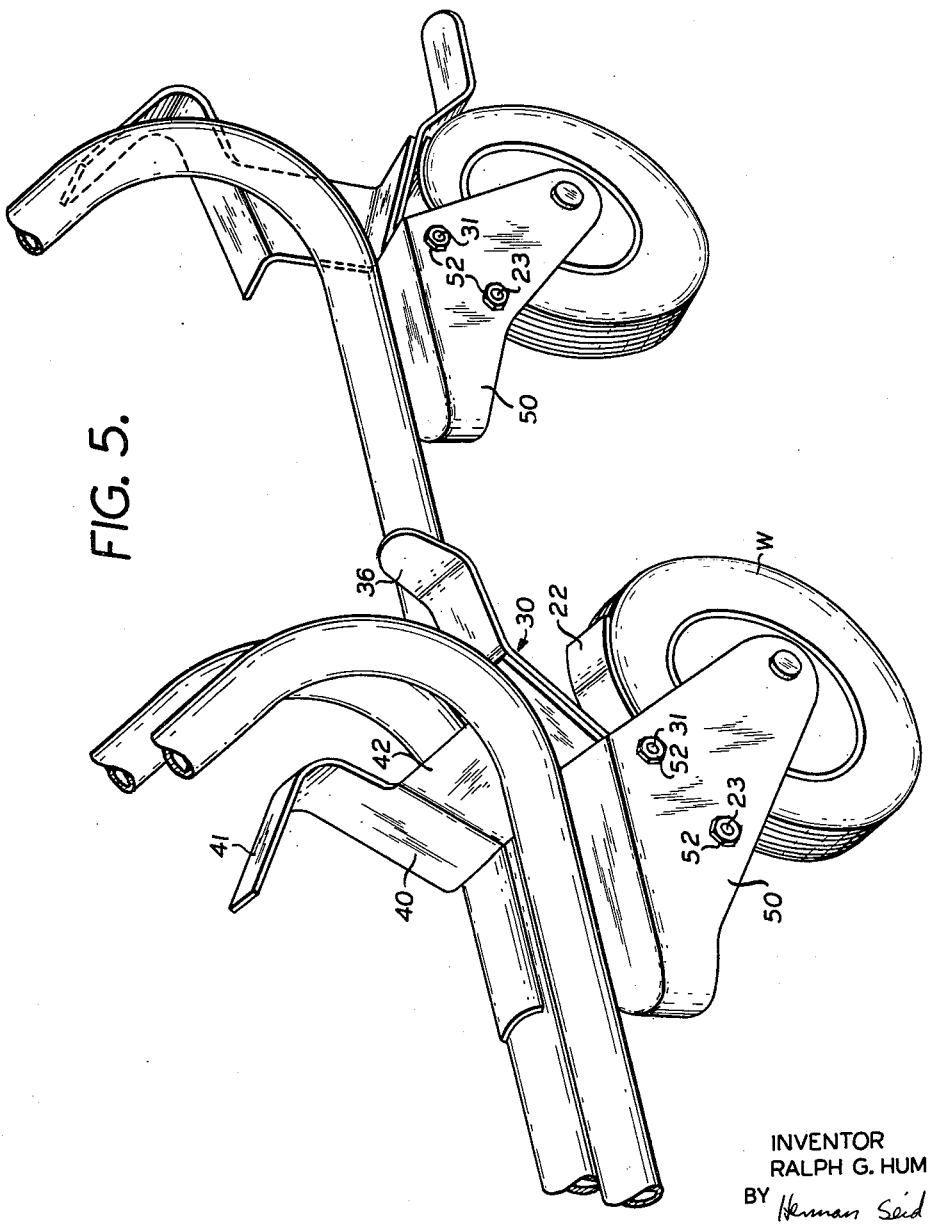

United States Patent Office 3,112,121
Patented Nov. 26, 1963

3,112,121
NESTING SHOPPING CART HAVING USER CONTROLLED BRAKE MEANS RELEASED BY NESTING ACTION OF ANOTHER LIKE CART
Ralph G. Hummer, Oklahoma City, Okla., assignor to Folding Carrier Corporation, Oklahoma City, Okla.
Filed Dec. 28, 1961, Ser. No. 162,898
7 Claims. (Cl. 280—33.99)

This invention relates to shopping carts, more particularly to brake means controlling the mobility of merchandise carrying carts of the nesting type.

Figure 1:
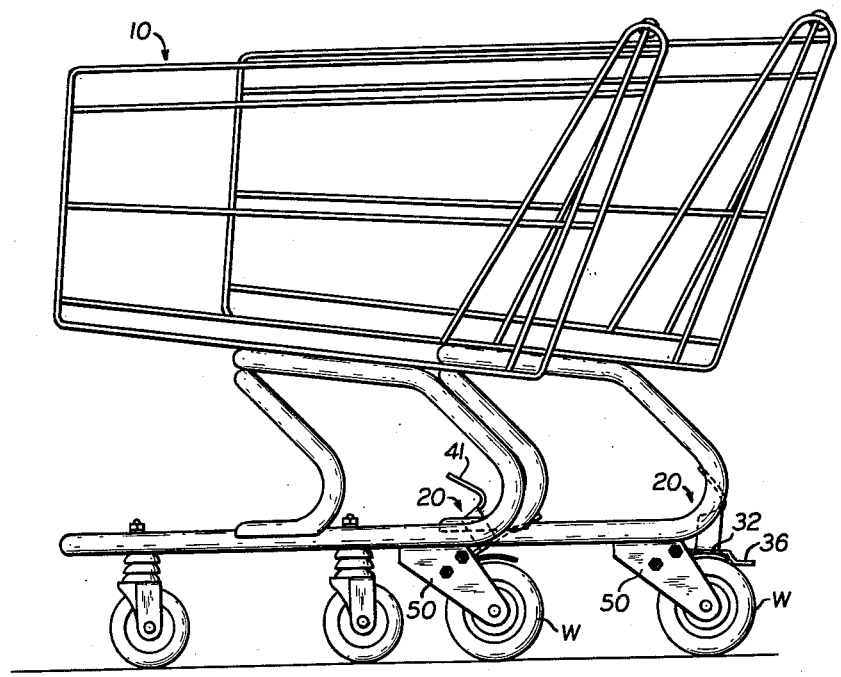
Figure 2:
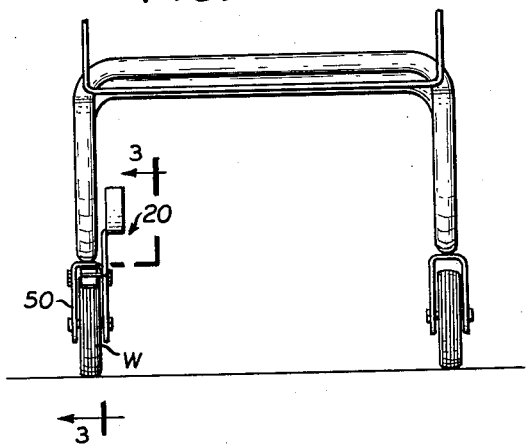

Contemporary merchandising techniques have given rise to the utilization of a nesting shopping cart, such for example as shown in FIGS. 1 and 2 of Goldman Patent 2,639,161 in which a merchandise carrying receptacle is mounted on a wheel chassis. The receptacle and the chassis are so shaped as to permit nesting of one cart within another to minimize the storage space requirements of the shopping carts when not in use. When the cart is being used by a shopper, it may readily be removed from its nested relationship with respect to other carts and moved about the shopping premises. The wheels of the cart chassis are such as to provide ready mobility for the cart. This freedom of movement necessitates constant control of the cart by the shopper, to prevent the cart from rolling off when on an incline such as may occur due to irregularities or slopes in the floor surface of shopping area, or the loading or unloading zones. Thus when the cart is used to carry merchandise from the market to a vehicle, ramps, or the like slopes between the shopping area and the parking area may impart undesired momentum to the shopping cart. Similarly, an irregularity in the floor in the shopping area may require that the shopper hold the cart, interfering with the shopper's freedom of movement in selecting merchandise for loading into the cart.

Where brakes are applied to the shopping cart to provide control of movement of the cart, problems are engendered when the nesting cart is stored during periods of non-use. This is due to the fact that during storage a plurality of carts are often shifted from one area to another. Thus, a number of carts may be collected in the parking area which are then nested one within the other and moved as a group into the shopping area. It is, of course, essential that the brakes of no one of this group of nested carts (other than possibly the last cart of the group) be in applied position since the movement of the group of carts will be impeded.

It is with the above problems and desiderata in mind that the present novel means have been evolved, means including both method and apparatus providing selective braking to control the mobility of a shopping cart as desired by the user. The novel braking means of any forward cart of a nested group are however, deactivated when a cart is nested with previous like carts for storage.

It is accordingly a primary object of this invention to provide braking means for shopping carts.

A further object of the invention is to provide a shopping cart with braking means selectively actuatable at the will of the user to control the mobility of a shopping cart.

Another object of the invention is to provide a nesting shopping cart with brake means which may be operable when the cart is in use for shopping purposes, but wherein said braking means are deactivated when other like carts are nested with the cart.

It is also an object of this invention to provide mobility control for nesting shopping carts in which said control may be activated only when the cart is in use either as an individual cart or as the last cart of a group of nested carts.

These and other objects of the invention which will become hereafter apparent are achieved by provision of a brake member having a shoe portion adapted to engage at least one of the wheels of the shopping cart. A brake control arm mounted adjacent the brake member determines the positioning of the brake member with respect to the wheel. Movement of the control arm to apply braking forces to the wheel is effected by means of a brake set pedal secured to the control arm whereby application of pedal forces by the user will result in application of the brake. A brake release pedal is also secured to the brake control arm so that upon application of foot pressure to the release pedal the control arm will be moved to release the brake from the wheel. Additionally, a storage release arm is secured to the brake control arm so that when the shopping cart is stored in nested relationship with like shopping carts the brake member will be released.

An important feature of the invention resides in the arrangement of the set pedal and the release pedal in a fashion such that downward foot pressure by the user is all that is required to effect desired mobility control of the shopping cart.

Another feature of the invention resides in the construction of the brake release pedal and storage release arm so that it may be constructed either as a unitary element thereby simplifying production costs or as a welded element to offset material waste in the blank.

An additional feature of the invention resides in the use of a novel overcenter mounting for the control arm so as to maintain same in a preselected brake applying position or brake releasing position.

Figure 3:
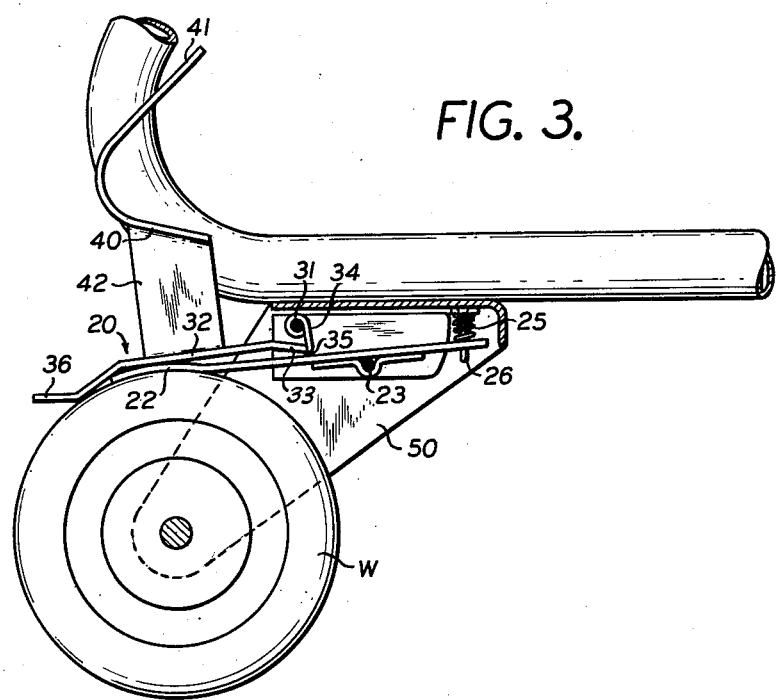
Figure 4:
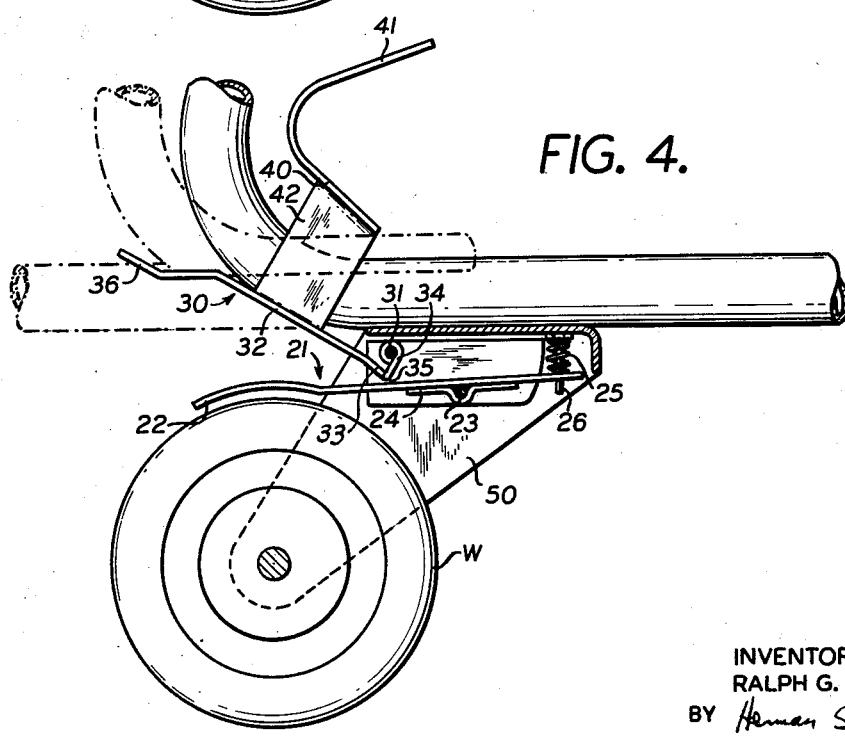

The specific details of a preferred embodiment of the invention, and their mode of functioning will be made most manifest and particularly pointed out in clear, concise and exact terms in conjunction with the accompanying drawings, wherein:

FIG. 1 is an elevational view through two nesting shopping carts embodying the instant inventive concept; and FIG. 2 is a detail rear elevational view of a cart of the type shown in FIG. 1 showing the carriage and the novel braking means; and FIG. 3 is a cross sectional detail view showing the novel braking mechanism in a position restraining movement of the shopping cart; and FIG. 4 is a cross sectional detail view similar to FIG. 3 illustrating the braking mechanism in a released position, and showing in dot dash lines how this release may be effected by nesting of like carts with the cart; and FIG. 5 is a perspective view showing a detail of the rear wheels of two carriages in nested relationship as in FIG. 1 with the brake of the forwardmost carriage released due to the nesting action, and the brake of the rearmost carriage applied, and subject to selective release.

Referring now more particularly to the drawings, like numerals in the various figures will be employed to designate like parts.

As seen in FIG. 1, the instant invention is shown as embodied in connection with a nesting shopping cart 10, two of which are illustrated in FIG. 1. The carts 10 are formed with a forwardly tapered merchandise receiving receptacle having a downwardly inclined bottom wall so that the front end of the receptacle of one shopping cart may be moved into the open rear end of a similarly shaped receptacle of another shopping cart. The undercarriage or chassis as will be understood by those skilled in the art is formed in a forwardly tapered and inclined configuration with an open back such that the front end of one chassis may be moved into the open rear end of the other. This arrangement of nesting or telescopic shopping carts is well known to those skilled in the art, and as will become apparent the instant inventive concept may be embodied in connection with any one of the large variety of nesting carts which have been evolved. The illustrated and described type of nesting cart is given only by way of example, it being understood that any cart of a nesting type may readily be employed in which a portion of one cart moves along a path in close proximity to that of another cart.

The novel mobility control means 20 are shown as applied to the left rear wheel of the illustrated shopping cart. It is generally found that desired mobility control of the entire carriage may readily be obtained when the novel mechanism is utilized in conjunction with a single wheel of the cart. However, a plurality of the novel mobility control mechanisms may be employed if desired, and the particular wheel to which it is applied is readily changeable within the scope of the invention. It is contemplated that in most installations the control means will be applied to a right rear wheel to accommodate the large majority of right handed users.

The novel mobility control means 20 as best seen in FIGS. 3 and 4 comprise a brake member or brake arm 21 having a shoe portion 22 adapted to engage the periphery of wheel W. Brake member 21 is pivotally supported on brake pivot pin 23 which rides between bearing strap 24 and the brake member. At the end of the brake member remote from shoe 22 a spring 25 is arranged about guide pin 26 to bear against the brake member biasing the brake shoe 22 away from wheel W, brake member 21 being arranged as a first class lever fulcrumed on pivot pin 23.

Brake control arm 30 is pivotally mounted on control arm pivot 31 adjacent brake member 21. Control arm 30 is formed with a main section 32 at one end of which is a slightly skew angled section 33 connected as a unitary element to pivot leg 34. The angle between angled section 33 and pivot leg 34 is preferably an acute angle very slightly less than 90 degrees with nose portion 35 formed between the angled section 33 and leg 34. A brake set pedal 36 is connected to control arm 30 to permit movement of the control arm by the application of downward foot pressure as will become hereafter apparent.

Secured to the control arm 30 is a storage release arm 40 here shown as formed integral with a brake release pedal 41. As best seen in FIG. 5, brake release pedal 41, storage release arm 40 and a connecting bracket 42 are formed as an integral unit adapted for connection to control arm 32.

The entire control assembly is arranged within wheel housing 50 with pivots 23 and 31 and guide pin 26 secured to the housing walls as will be understood by those skilled in the art. Appropriate nuts 52 as best seen in FIG. 5 may be employed to maintain the pivots 23 and 31 in position with respect to the housing, it being understood that the ends of pivots 23 and 31 are threaded to accommodate nuts 56, though pivots 23 and 31 may be rivets.

Operation

The aforedescribed braking mechanism is particularly adapted to control the mobility of a shopping cart of the nesting type. It will, however, be apparent to those skilled in the art that the novel braking mechanism which functions to provide selective control of movement of a wheeled vehicle when in use, and deactivation of the braking mechanism when the vehicle is stored may readily be utilized in a variety of other environments where the vehicle in conjunction with which the brake is embodied is positioned in a way such as to actuate the storage release arm 40.

As employed in connection with a nesting shopping cart 10 of the type here illustrated, it is contemplated that the shopping cart when in use will be wheeled to any desired point of stoppage such as at a display shelf where merchandise is to be selected. The user or customer wishing to make certain that the cart will not be moved, merely applies foot pressure to brake set pedal 36 causing control arm 30 to pivot about pivot pin 31, moving nose portion 35 against brake member 21 to depress same against wheel W. When the pedal 36 has been depressed to its limited lower position as illustrated in FIG. 3 control arm 32 will contact brake shoe 22 which will have been forced against the peripheral surface of wheel W. The brake shoe 22 will be maintained in this wheel engaging position by virtue of the fact that the nose portion 35 between angle section 33 and pivot length 34 will have moved to the right of the vertical center line through pivot 31, whereby a toggle action will result securing the control arm 32 in its downward brake engaging position as viewed in FIG. 3.

When the user desires to release the brake to permit movement of the cart, it is merely necessary to apply downward foot pressure to brake release pedal 41 which action results in a clockwise movement (as viewed in FIGS. 3 and 4) of control arm 32 about pivot 31 thereby moving the nose portion 35 to the left of the center line through pivot 31 as viewed in FIG. 4. This releases brake member 21 permitting spring 25 to extend and act on brake member 21 as a force applied to a first class lever fulcrumed at pivot 23 raising brake shoe 22 from the peripheral surface of wheel W.

When the shopping cart 10, as illustrated in FIG. 1 is nested with like carts during periods of non-use, it is desirable to make certain that the brake is not applied to any of the carts, other than possibly the last cart. This is so since large batches of non-used carts are often moved from one location to the other. Thus a number of carts may be collected in a parking area and subsequently moved to the shopping area. Where a group of these carts is stored, application of the brake of the last of the carts is sufficient to prevent the entire nested group of carts from moving. However, the addition of other carts to the group necessitates the release of the brake from the last cart of the previously nested group, otherwise movement of the group would not be possible.

This is accomplished by virtue of the fact that the storage release arm 40 will be raised by the chassis or undercarriage of the last nested cart of the group as viewed in FIGS. 4 and 5. Thus upon nesting of the last cart with another that has had the brake applied, the movement of the last cart will exert an upward force on the storage release arm 40 of the other cart, raising the control arm to the position illustrated in FIG. 4 thereby freeing brake shoe 22 from the wheel W.

It is thus seen that a simple mobility control mechanism has been provided permitting the selective application of brake pressure by the user of a shopping cart during periods of use. However, when the shopping cart is nested for storage, only the last cart of the nested group may have its brake applied. All forward carts in the group of nested carts will have their brakes automatically released.

The novel means are simple of manufacture and use and require minimal maintenance.

The above disclosure has been given by way of illustration and elucidation, and not by way of limitation, and it is desired to protect all embodiments of the herein disclosed inventive concept within the scope of the appended claims.

What is claimed is:

1. In a shopping cart having an undercarriage mounted on front and rear wheels and a merchandise containing receptacle supported on said carriage, said shopping cart being adapted for telescoping association with a similar cart, a selectively operable brake member arranged adjacent a rear wheel of said carriage; control arm mounted adjacent said brake member to move thereagainst forcing same to a braking position against the wheel; a brake set pedal on said control arm projecting rearwardly of said cart permitting the application of downward foot pressure to obtain brake application; an upwardly and forwardly projecting brake release pedal secured to said arm to permit the exertion of foot pressure in a direction to obtain braking release; and a storage release arm secured to said brake control arm and extending in the path of movement of the undercarriage of an associated telescoping cart whereby engagement of said undercarriage of said associated cart with said storage release arm moves said control arm to a brake deactivating position when a pair of said carts are telescopically associated.

2. In a shopping cart as in claim 1: a pivot leg secured to said control arm; a pivot pivotally supporting said control arm and said leg; and a nose portion formed between said leg and said arm, said nose portion movable through a vertical center line through said pivot, and bearing against said brake member to effect a toggle action of said control arm with respect to said brake member, whereby said brake member will be held in a braking position or non-braking position as determined by the position of said control arm.

3. In a telescoping cart having a frame, a basket carried by said frame, said basket having converging sidewalls generally tapering forwardly for telescopic association with a basket of a cart of similar construction, wheels supporting said cart, a brake for one of said wheels, a brake arm for said brake, means normally urging said brake out of braking association with its wheel, a brake set pedal engaging said brake arm and projecting toward the rear of said cart permitting the application of foot pressure to obtain brake application to said wheel, a brake release pedal mounted on said brake set pedal, said brake relese pedal being positioned above said brake set pedal and projecting forwardly therefrom to permit the exertion of foot pressure in a direction to obtain braking release, and a storage release arm fixed to and located between the brake set pedal and brake release pedal, said storage release arm extending in the path of movement of the frame of the telescoping cart, whereby said frame will engage said storage release arm to release said brake when a pair of said carts are telescopically associated.

4. The structure of claim 3 characterized in that wheel housings are provided for the wheels and the brake and brake set pedal are pivotally mounted in the wheel housings and project outwardly and rearwardly thereof.

5. The structure of claim 3 characterized in that the brake set pedal includes a pivoted offset terminal providing a camming area for engaging the brake arm.

6. The structure of claim 3 characterized in that the brake set pedal which is pivotally mounted in the wheel housing supports said storage release arm and the brake release pedal is mounted on the storage release arm and projects upwardly and forwardly thereof.

7. In a telescoping cart having a frame, a basket carried by said frame, said basket having converging sidewalls generally tapering forwardly for telescopic association with a basket of a cart of similar construction, wheel housings fixed to said frame, wheels in said wheel housings for supporting said cart, a brake for one of said wheels, a brake arm mounting said brake, said brake arm being pivotally mounted in its wheel housing, spring means located within the wheel housing normally urging the brake out of braking engagement with the wheel, a brake set pedal for engaging said brake arm permitting the application of foot pressure to said brake, said brake set pedal being pivotally mounted in said housing above said brake arm, and a storage release arm and a brake release pedal fixed to said brake set pedal, said storage release arm normally projecting in the path of movement of a frame of a telescoping associated cart to lift said brake arm to release said brake, and said brake set pedal release pedal having an upwardly and forwardly facing portion to permit the exertion of foot pressure in an upward direction to lift said brake arm to obtain braking release.

References Cited in the file of this patent

UNITED STATES PATENTS

| | | |
|---|---|---|
| 1,451,630 | Perkins | Apr. 10, 1923 |
| 1,785,421 | Nielsen | Dec. 16, 1930 |
| 2,572,548 | Wiesz et al. | Oct. 23, 1951 |
| 2,591,524 | Douglas et al. | Apr. 1, 1952 |
| 2,785,906 | Matter | Mar. 19, 1957 |
| 2,958,537 | Young | Nov. 1, 1960 |